United States Patent
Gao

(10) Patent No.: US 10,523,890 B2
(45) Date of Patent: Dec. 31, 2019

(54) AUDIO AND VIDEO TRANSMITTING DEVICE, AUDIO AND VIDEO RECEIVING DEVICE, AND WIRELESS AUDIO AND VIDEO TRANSFER SYSTEM

(71) Applicant: SHENZHEN LENKENG TECHNOLOGY CO., LTD., Shenzhen, Guangdong Province (CN)

(72) Inventor: Binghai Gao, Shenzhen (CN)

(73) Assignee: SHENZHEN LENKENG TECHNOLOGY CO., LTD., Shenzhen, Guangdong Province (CN)

( * ) Notice: Subject to any disclaimer, the term of this patent is extended or adjusted under 35 U.S.C. 154(b) by 0 days.

(21) Appl. No.: 16/264,674

(22) Filed: Jan. 31, 2019

(65) Prior Publication Data
US 2019/0238782 A1    Aug. 1, 2019

(30) Foreign Application Priority Data
Feb. 1, 2018  (CN) .................. 2018 2 0176918 U

(51) Int. Cl.
| | |
|---|---|
| *H04N 5/40* | (2006.01) |
| *H04N 5/44* | (2011.01) |
| *H04N 5/455* | (2006.01) |
| *G09G 5/00* | (2006.01) |
| *H04N 21/436* | (2011.01) |
| *H04W 92/00* | (2009.01) |

(52) U.S. Cl.
CPC .............. *H04N 5/40* (2013.01); *G09G 5/006* (2013.01); *H04N 5/4401* (2013.01); *H04N 5/455* (2013.01); *H04N 21/436* (2013.01); *H04W 92/00* (2013.01)

(58) Field of Classification Search
CPC .......... H04N 21/436; H04N 5/40; H04N 5/38; H04N 5/4401; H04N 5/44; H04N 5/4403; H04N 5/455; G09G 5/006; H04W 92/00
USPC ...... 348/723–728; 725/67, 68, 98, 100, 118, 725/131, 123, 148, 151; 375/219, 295, 375/316; 455/3.01, 3.05, 39, 73, 151.2
See application file for complete search history.

(56) References Cited

U.S. PATENT DOCUMENTS

| | | | | |
|---|---|---|---|---|
| 2013/0010849 A1* | 1/2013 | Shimizu | ................. | G09G 5/006 375/219 |
| 2013/0329139 A1* | 12/2013 | Feher | ................... | H04N 5/4401 348/724 |

* cited by examiner

*Primary Examiner* — Sherrie Hsia
(74) *Attorney, Agent, or Firm* — Cheng-Ju Chiang

(57) ABSTRACT

An audio and video transmitting device includes a source-end connecting unit configured to receive an audio and video signal from a video source; a transmitting-end processing unit configured to process the audio and video signal and generate a processed audio and video signal; a first wireless unit configured to modulate the processed audio and video signal and generate a modulated audio and video signal; a transmitting-end antenna configured to send the modulated audio and video signal; and a transmitting-end peripheral interface configured to receive a first peripheral information from a source-end peripheral device and send the first peripheral information to the transmitting-end processing unit which sends the first peripheral information to the video source through the source-end connecting unit. Thus, the video source such as the smart device acquires data from peripheral devices through the transmitting-end peripheral interface, which increases the interaction means of the audio and video transmitting device.

15 Claims, 2 Drawing Sheets

AUDIO AND VIDEO TRANSMITTING DEVICE, AUDIO AND VIDEO RECEIVING DEVICE, AND WIRELESS AUDIO AND VIDEO TRANSFER SYSTEM

CROSS REFERENCE TO RELATED APPLICATIONS

Pursuant to 35 U.S.C. § 119 and the Paris Convention Treaty, this application claims foreign priority to Chinese Patent Application No. 201820176918.5 filed in Feb. 1, 2018, the contents of which, including any intervening amendments thereto, are incorporated herein by reference.

TECHNICAL FIELD

The present invention relates to a multimedia transmission technology, in particular to an audio and video transmitting device, an audio and video receiving device, and a wireless audio and video transfer system.

BACKGROUND

Video is a visual show which gives users an intuitive view of various information. At present, a conventional video interface of a television is single, and the video interface is mainly a High-Definition Multimedia Interface (HDMI). Smart devices such as mobile phones and tablet computers are seldom configured with the HDMI interface. Thus, a complicated conversion device and an expensive cable are needed for connecting the smart device to a display device, such as conventional televisions. The process involves wiring. In addition, the cable transmission mostly has a transmission distance limit. This limits the application of the high-definition video transmission.

Some prior arts disclose transmitting an audio and video signal wirelessly. However, the smart devices such as the mobile phones and the tablet computers cannot be connected to peripheral devices such as a USB flash drive, a mouse, a keyboard, and so on. Thus, only the data of the smart device can be read, leading to single interaction means.

SUMMARY

In order to overcome deficiencies of the prior art, the present invention provides an audio and video transmitting device, an audio and video receiving device, and a wireless audio and video transfer system, which may solve the following problems: in existing wireless transmission mode of an audio and video signal, traditional smart devices such as mobile phones and tablet computers can only read data stored in the smart device and cannot be connected to peripheral devices such as a USB flash drive, a mouse, a keyboard, and so on.

The objective of the present embodiment is achieved by the following technical solutions:

The present embodiment provides an audio and video transmitting device, which includes a source-end connecting unit configured to receive an audio and video signal from a video source, a transmitting-end processing unit configured to process the audio and video signal and generate a processed audio and video signal, a first wireless unit configured to modulate the processed audio and video signal and generate a modulated audio and video signal, a transmitting-end antenna configured to send the modulated audio and video signal, and a transmitting-end peripheral interface configured to receive a first peripheral information from a source-end peripheral device and send the first peripheral information to the transmitting-end processing unit which sends the first peripheral information to the video source through the source-end connecting unit.

Preferably, the source-end connecting unit includes a USB TYPE-C interface, and the audio and video signal received by the transmitting-end processing unit from the video source through the source-end connecting unit is in a Display Port (DP) format.

Preferably, the first wireless unit includes a first processor configured to perform an Orthogonal Frequency Division Multiplexing (OFDM) algorithm, and the transmitting antenna is an OFDM antenna.

Preferably, the transmitting-end peripheral interface includes at least one USB-A interface.

Preferably, the first wireless unit is further configured to receive a second peripheral information through the transmitting-end antenna, and the transmitting-end processing unit is configured to send the second peripheral information to the video source through the source-end connecting unit.

An audio and video receiving device includes a receiving-end antenna configured to receive a wireless signal, a second wireless unit configured to demodulate the wireless signal and generate a demodulated audio and video signal, a receiving-end processing unit configured to process the demodulated audio and video signal and generate a processed audio and video signal, a receiving-end connecting unit configured to send the processed audio and video signal to a receiving end device, and a receiving-end peripheral interface configured to receive a second peripheral information from a receiving-end peripheral device and send the second peripheral information to the receiving-end processing unit. The receiving-end processing unit is further configured to process the second peripheral information and generate a processed second peripheral information, the second wireless unit is further configured to modulate the processed second peripheral information and generate a modulated second peripheral information, and the receiving-end antenna is further configured to send the modulated second peripheral information.

Preferably, the second wireless unit includes a second processor configured to perform an OFDM algorithm, and the receiving-end antenna is an OFDM antenna.

Preferably, the receiving-end connecting unit includes a High-Definition Multimedia Interface (HDMI), and the receiving-end processing unit is configured to process the demodulated audio and video signal into HDMI data, and output the HDMI data to the receiving end device via the HDMI interface.

Preferably, the receiving-end peripheral interface includes at least one USB-A interface.

The present invention further provides a wireless transfer audio and video system which includes a source-end connecting unit configured to receive an audio and video signal from a video source, a transmitting-end processing unit configured to process the audio and video signal and generate a first processed audio and video signal, a first wireless unit configured to modulate the first processed audio and video signal and generate a modulated audio and video signal, a transmitting-end antenna configured to send the modulated audio and video signal, a receiving-end antenna configured to receive the modulated audio and video signal, a second wireless unit configured to demodulate the wireless signal and generate a demodulated audio and video signal, a receiving-end processing unit configured to process the demodulated audio and video signal and generate a second processed audio and video signal, a receiving-end connecting unit configured to send the second processed audio and video signal to a receiving end device, and a peripheral interface configured to receive a peripheral information from a peripheral device and send the peripheral information to the transmitting-end processing unit or the receiving-end processing unit.

Preferably, the peripheral interface is a transmitting-end peripheral interface configured to receive a first peripheral information from a source end peripheral device and send the first peripheral information to the transmitting-end processing unit which sends the first peripheral information to the video source through the source-end connecting unit.

Preferably, the system further comprises a receiving-end peripheral interface configured to receive a second peripheral information from a receiving-end peripheral device and send the second peripheral information to the receiving-end processing unit; wherein the receiving-end processing unit is further configured to process the second peripheral information and generate a processed second peripheral information, the second wireless unit is further configured to modulate the processed second peripheral information and generate a modulated second peripheral information, and the receiving-end antenna is further configured to send the modulated second peripheral information to the transmitting-end antenna.

Alternatively, the peripheral interface is configured to receive the peripheral information from a receiving-end peripheral device and send the peripheral information to the receiving-end processing unit; wherein the receiving-end processing unit is further configured to process the peripheral information and generate a processed peripheral information, the second wireless unit is further configured to modulate the processed peripheral information and generate a modulated peripheral information, and the receiving-end antenna is further configured to send the modulated peripheral information to the transmitting-end antenna.

Compared with the prior art, the present disclosure has the beneficial effects that: the wireless audio and video transfer system is configured with the transmitting-end peripheral interface in the audio and video receiving device and/or the receiving-end peripheral interface in the audio and video receiving device, and the wireless audio and video transfer system may be connected to the peripheral device such as a USB flash drive, a mouse, a keyboard, and a trackpad. Therefore, the video source such as the smart device can acquire data from the source-end peripheral device and/or the receiving-end peripheral device through the transmitting-end peripheral interface and/or the receiving-end peripheral interface, increasing the interaction means of the audio and video transmitting device, the audio and video receiving device, and the wireless transfer system of audio and video.

The figure: 110, source-end connecting unit; 120, transmitting-end processing unit; 130, first wireless unit; 140, transmitting-end antenna; 150, transmitting-end peripheral interface; 210, receiving-end antenna; 220, second wireless unit; 230, receiving-end processing unit; 240, receiving-end connecting unit; 250, receiving-end peripheral interface; 10, video source; 20, source-end peripheral device; 30, receiving end device; 40, receiving-end peripheral device.

DETAILED DESCRIPTION OF THE PREFERRED EMBODIMENTS

Below, the present invention will be further described in combination with the FIGS. 1-2 and the embodiments. It should be noted that, a new embodiment may be formed through arbitrary combination between the embodiments or among the technical features without conflict.

Embodiment 1

Figure 1:
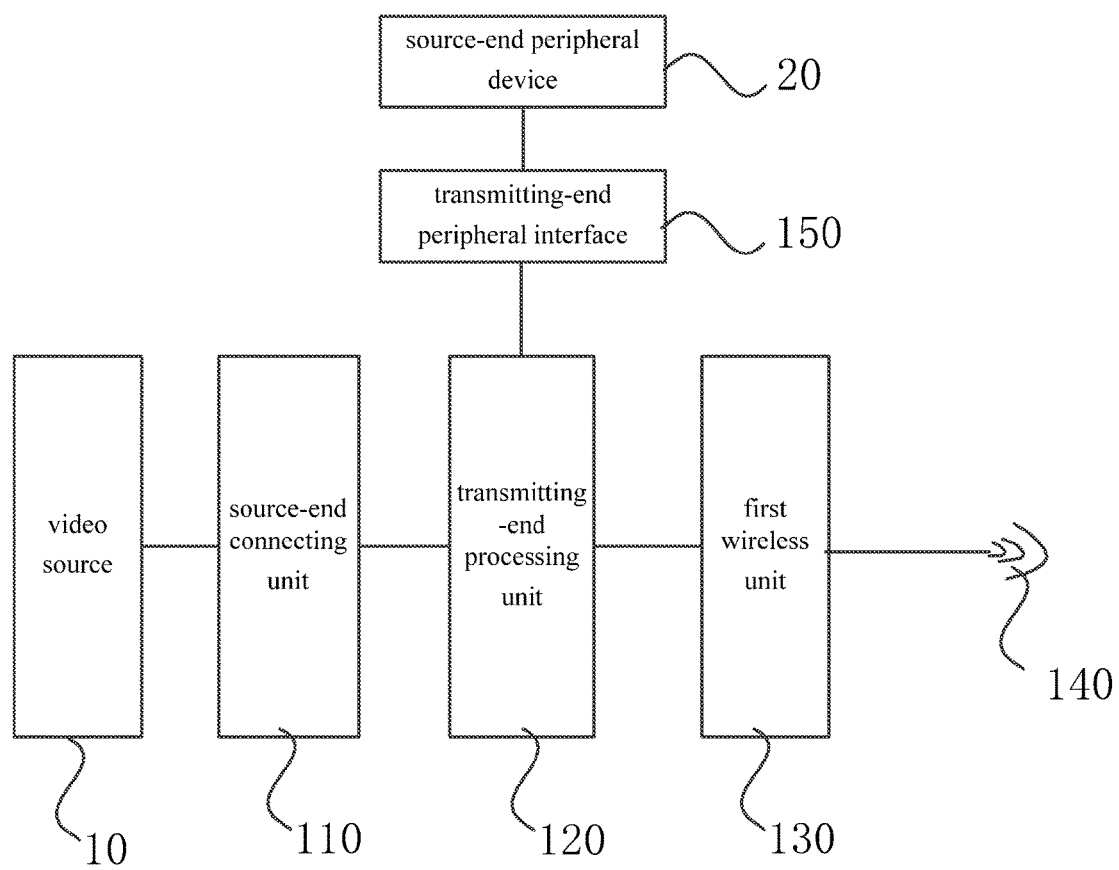
FIG. 1 is a schematic structural view of an audio and video transmitting device according to an embodiment 1 of the present invention.

As shown in FIG. 1, a first embodiment of the present invention provides an audio and video transmitting device, which includes a source-end connecting unit 110, a transmitting-end processing unit 120, a first wireless unit 130, a transmitting-end antenna 140, and a transmitting-end peripheral interface 150. The source-end connecting unit 110, the first wireless unit 130, and the transmitting-end peripheral interface 150 are electrically connected to the transmitting-end processing unit 120, and the transmitting-end antenna 140 is electrically connected to the first wireless unit 130.

The transmitting-end processing unit 120 is configured to receive an audio and video signal from a video source 10 through the source-end connecting unit 110. The video source 10 may be a mobile phone, a tablet computer, a laptop, an image pickup device, and so on.

As a preferred embodiment, the source-end connecting unit 110 includes a USB TYPE-C interface, and the transmitting-end processing unit 120 is configured to obtain the audio and video signal in a Display Port (DP) format from the video source 10 through the source-end connecting unit 110.

Similar to the HDMI, the DP interface permits audio signals and video signals to be transmitted via a same cable, and is applied to a plurality of high quality digital audios. However, more advanced than the HDMI, the DP interface can achieve more functions on one cable. Besides four main transmitting channels, the DP interface provides a powerful auxiliary channel. The auxiliary channel has a transmission bandwidth of 1 Mbps and a maximum delay of only 500 µs. Therefore, the auxiliary channel may be directly used as a transmitting channel for low-bandwidth data such as voice and video, and it may also be used for game control without delay. The DP interface has a capacity of maximum integration and control to peripheral devices.

A standard interface such as a USB TYPE-C interface may be used as an external connector of the DP interface. In the first embodiment of the present invention, the USB TYPE-C interface is connected to the video source 10 such as the mobile phone, the tablet computer, the laptop, or the image pickup device, and so on, and is configured to receive the audio and video signal in DP format from the video source 10.

The transmitting-end processing unit 120 is further configured to process the audio and video signal, such as encryption, compression, and so on. The first wireless unit 130 is configured to modulate the audio and video signal processed by the transmitting-end processing unit 120, and then send the modulated audio and video signal through the transmitting-end antenna 140.

As a preferred embodiment, the first wireless unit 130 includes a first processor configured to perform an Orthogonal Frequency Division Multiplexing (OFDM) algorithm, and the transmitting antenna 140 is an OFDM antenna. That is, the first wireless unit 130 performs OFDM modulation on the audio and video signal processed by the transmitting-end processing unit 120.

OFDM is a high-speed data transmission technology. A basic principle of the OFDM technology is to transform high-speed serial data into multi-channel relative low-speed parallel data, and modulate different carriers. This kind of parallel transmission system greatly expands a pulse width of data symbol, and improves performance against harsh transmission conditions such as multipath fading.

The OFDM technology is a multi-carrier digital communication technology, which develops from a Multi-Carrier Modulation (MCM) technology. A significant feature of the OFDM technology is that each sub-carrier used in the OFDM technology is orthogonal to each other. The technology is commonly referred to as Discrete Multi-tone Modulation (DMT) technology in wired communication industry. The OFDM technology may perform efficient anti-interference modulation, improve frequency band utilization, and greatly reduce errors during transmission.

The transmitting-end processing unit 120 is further configured to receive a first peripheral information from a source-end peripheral device 20 via the transmitting-end peripheral interface 150, and send the first peripheral information to the video source 10 through the source-end connecting unit 110.

In the embodiment, the transmitting-end peripheral interface 150 includes at least one USB-A interface, and is electrically connected to the source-end peripheral device 20 such as a USB flash drive, a mouse, a keyboard, and a trackpad. The first peripheral information may be video information, audio information, image information, or a document stored in the USB flash drive, or may be control information of the mouse or the trackpad, or may be a character or a control command input by the keyboard.

The transmitting-end processing unit 120 may transmit the video information, the audio information, the image information, or documents, and so on, to the video source 10 to allow the information to be copied. The transmitting-end processing unit 120 may transmit the control information, the control commands, and so on, to the video source 10 in order to control the video source 10 such as switching the video and the like. Thus, in the embodiment, the video source 10 such as the smart device may acquire data from the source-end peripheral device 20 through the audio and video transmitting device, increasing the interaction means of the audio and video transmitting device.

As a further improvement of the embodiment of the present invention, the first wireless unit 130 is further configured to receive a second peripheral information through the transmitting-end antenna 140, and the transmitting-end processing unit 120 is further configured to process the second peripheral information and send the processed second peripheral information to the video source 10 through the source-end connecting unit 110.

In the embodiment of the present invention, the audio and video transmitting device is wirelessly connected to an audio and video receiving device, and the audio and video receiving device is connected to a receiving-end peripheral device 40 such as the USB flash drive, the mouse, the keyboard, the trackpad, and so on. The audio and video receiving device transmits the second peripheral information of the peripheral devices to the audio and video transmitting device. Specifically, the first wireless unit 130 receives the second peripheral information through the transmitting-end antenna 140, and then the transmitting-end processing unit 120 processes the second peripheral information and sends the processed second peripheral information to the video source 10 through the source-end connecting unit 110. Thus, in the embodiment, the video source 10 such as the smart device can acquire data from the receiving-end peripheral device 40 through the audio and video receiving device, increasing the interaction means of the audio and video transmitting device.

In the first embodiment of the present invention, the audio and video transmitting device is configured with the transmitting-end peripheral interface 150 to connect the peripheral devices such as the USB flash drive, the mouse, the keyboard, the trackpad, and so on. Thus, the video source 10 such as the smart device can acquire data from the peripheral devices 20 through the audio and video transmitting device, increasing interaction means of the audio and video transmitting device.

Embodiment 2

Figure 2:
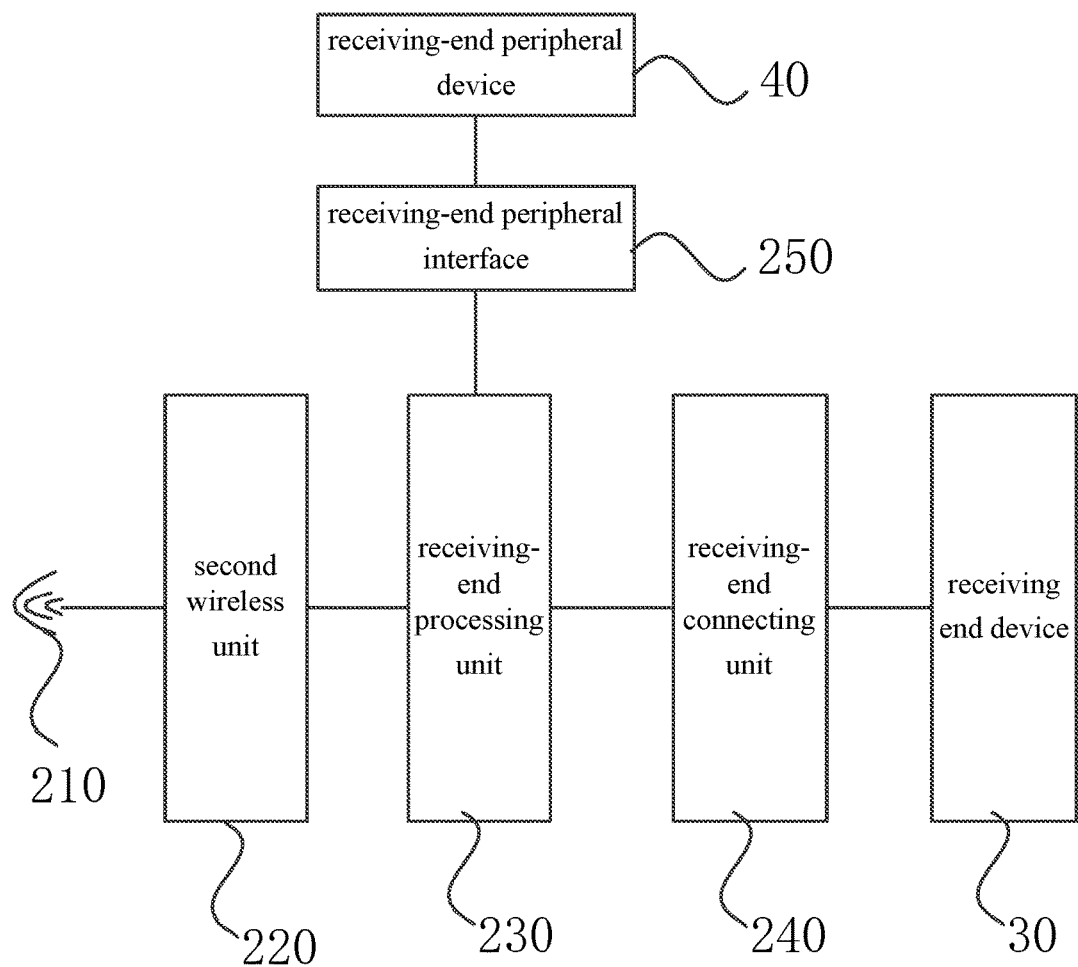
FIG. 2 is a schematic structural view of an audio and video receiving device according to an embodiment 2 of the present invention.

As shown in FIG. 2, the audio and video receiving device includes a receiving-end antenna 210, a second wireless unit 220, a receiving-end processing unit 230, a receiving-end connecting unit 240, and a receiving-end peripheral interface 250. The second wireless unit 220, the receiving-end connecting unit 240, and the receiving-end peripheral interface 250 are electrically connected to the receiving-end processing unit 230, and the receiving-end antenna 210 is electrically connected to the second wireless unit 220.

The receiving-end antenna 210 is configured to receive a wireless signal sent by the transmitting-end antenna 140, and the second wireless unit 220 is configured to demodulate the wireless signal to the audio and video signal. Specifically, the receiving-end antenna 210 receives the wireless signal from the audio and video transmitting device of the first embodiment, and the second wireless unit 220 demodulates the wireless signal to the audio and video signal which is the same as the audio and video signal before being modulated by the first wireless unit 130.

As a preferred embodiment, the second wireless unit 220 includes a second processor configured with an OFDM algorithm, and the receiving-end antenna 210 is an OFDM antenna. That is, the second wireless unit 220 is configured to perform OFDM demodulation on the wireless signal to obtain the audio and video signal.

OFDM is the high-speed data transmission technology. The basic principle of the OFDM technology is to transform the high-speed serial data into the multi-channel relative low-speed parallel data, and modulate different carriers. This kind of parallel transmission system greatly expands the pulse width of data symbol, and improves performance against harsh transmission conditions such as multipath fading.

The OFDM technology is the multi-carrier digital communication technology, which develops from the MCM technology. The significant feature of the OFDM technology is that each sub-carrier used in the OFDM technology is orthogonal to each other. The technology is commonly referred to as DMT technology in wired communication industry. The OFDM technology may perform efficient anti-interference modulation, improve frequency band utilization, and greatly reduce errors during transmission.

The receiving-end processing unit 230 is configured to process the audio and video signal demodulated by the second wireless unit 220, and send the processed audio and video signal to the receiving-end connecting unit 240. A receiving end device 30 is configured to receive the processed audio and video signal from the receiving-end connecting unit 240, and the receiving device 30 may be a display, a television, a projector, and so on.

The receiving-end processing unit 230 is further configured to receive the second peripheral information from the receiving-end peripheral device 40 through the receiving-end peripheral interface 250. The second wireless unit 220 is further configured to modulate the second peripheral information processed by the receiving-end processing unit 230, and sends the modulated second peripheral information to the audio and video transmitting device through the receiving-end antenna 210.

As a preferred embodiment, the receiving-end peripheral interface 250 includes at least one USB-A interface, and is electrically connected to the receiving-end peripheral device 40 such as the USB flash drive, the mouse, the keyboard. The second peripheral information is a video information, an audio information, an image information, or a document stored in the USB flash drive, or is a control information of the mouse or the trackpad, or is a character or a control command input by the keyboard.

The audio information, the image information, the document, the control information, the control command, and so on, which comes from the receiving-end peripheral device 40, is sent to the audio and video transmitting device via the receiving-end antenna 210 after being processed and modulated by the audio and video receiving device. The audio and video transmitting device transmits the second peripheral information to the video source 10. The video source 10 such as the smart device is configured to acquire data from the receiving-end peripheral device 40 through the audio and video receiving device, increasing interaction means of the audio and video transmitting device and the audio and video receiving device.

As a preferred embodiment, the receiving-end connecting unit 240 includes the HDMI interface, the audio and video signal demodulated by the second wireless unit 220 is processed into HDMI data by the receiving-end processing unit 230, and the HDMI data is transmitted to the receiving end device 30 via the HDMI interface. Therefore, the audio and video receiving device is configured to transmit the audio and video data of the video source 10 such as the smart device to the receiving end device 30 for playback via HDMI cable.

In the embodiment of the present invention, the audio and video receiving device is connected to the peripheral devices such as the USB flash drive, the mouse, the keyboard, the trackpad, and so on, through the receiving-end peripheral interface 250. The video source 10 such as the smart device is configured to acquire data from the receiving-end peripheral device 40 through the audio and video receiving device, increasing interaction means of the audio and video transmitting device and the audio and video receiving device.

The audio and video transmitting device and the audio and video receiving device described above constitute a wireless audio and video transfer system, namely:

The wireless audio and video transfer system includes the aforementioned audio and video transmitting device and the aforementioned audio and video receiving device. The structure and working principle are described in the first embodiment and the second embodiment, and details are not described herein again.

It should be noted that if the audio and video transmitting device includes the transmitting-end peripheral interface 150, the receiving-end peripheral interface 250 of the audio and video receiving device may be omitted. If the audio and video receiving device includes the receiving-end peripheral interface 250, the transmitting-end peripheral interface 150 of the audio and video transmitting device may be omitted. Optionally, the wireless audio and video transfer system may be simultaneously configured with the transmitting-end peripheral interface 150 and the receiving-end peripheral interface 250.

In the embodiment of the present invention, the wireless audio and video transfer system is configured with the transmitting-end peripheral interface 150 in the audio and video receiving device and/or the receiving-end peripheral interface 250 in the audio and video receiving device, and the system may be connected to the peripheral devices such as the USB flash drive, the mouse, the keyboard, and the trackpad. The video source 10 such as the smart device is configured to acquire data from the source-end peripheral device 20 and/or the receiving-end peripheral device 40 through the transmitting-end peripheral interface 150 and/or the receiving-end peripheral interface 250, increasing interaction means of the audio and video transmitting device, the audio and video receiving device, and the wireless audio and video transfer system.

The above embodiments are only the preferred embodiments of the present invention, and do not limit the scope of the present invention. A person skilled in the art may make various other corresponding changes and deformations based on the described technical solutions and concepts. And all such changes and deformations shall also fall within the scope of the present invention.

What is claimed is:
1. An audio and video transmitting device, comprising:
   a source-end connecting unit configured to receive an audio and video signal from a video source;
   a transmitting-end processing unit configured to process the audio and video signal and generate a processed audio and video signal;
   a first wireless unit configured to modulate the processed audio and video signal and generate a modulated audio and video signal;
   a transmitting-end antenna configured to send the modulated audio and video signal; and
   a transmitting-end peripheral interface configured to receive a first peripheral information from a source-end peripheral device and send the first peripheral information to the transmitting-end processing unit which sends the first peripheral information to the video source through the source-end connecting unit.

2. The audio and video transmitting device of claim 1, wherein the source-end connecting unit comprises a USB TYPE-C interface, and the audio and video signal received by the transmitting-end processing unit from the video source through the source-end connecting unit is in a Display Port format.

3. The audio and video transmitting device of claim 2, wherein the first wireless unit comprises a first processor configured to perform an OFDM algorithm, and the transmitting antenna is an OFDM antenna.

4. The audio and video transmitting device of claim 3, wherein the transmitting-end peripheral interface comprises at least one USB-A interface.

5. The audio and video transmitting device of claim 1, wherein the first wireless unit is further configured to receive a second peripheral information through the transmitting-end antenna, and the transmitting-end processing unit is configured to send the second peripheral information to the video source through the source-end connecting unit.

6. An audio and video receiving device, comprising:
a receiving-end antenna configured to receive a wireless signal;
a wireless unit configured to demodulate the wireless signal and generate a demodulated audio and video signal;
a receiving-end processing unit configured to process the demodulated audio and video signal and generate a processed audio and video signal;
a receiving-end connecting unit configured to send the processed audio and video signal to a receiving end device; and
a receiving-end peripheral interface configured to receive a peripheral information from a receiving-end peripheral device and send the peripheral information to the receiving-end processing unit;
wherein the receiving-end processing unit is further configured to process the peripheral information and generate a processed peripheral information, the wireless unit is further configured to modulate the processed peripheral information and generate a modulated peripheral information, and the receiving-end antenna is further configured to send the modulated peripheral information.

7. The audio and video receiving device of claim 6, wherein the wireless unit comprises a processor configured to perform an OFDM algorithm, and the receiving-end antenna is an OFDM antenna.

8. The audio and video receiving device of claim 7, wherein the receiving-end connecting unit comprises a HDMI interface, and the receiving-end processing unit is configured to process the demodulated audio and video signal into HDMI data, and output the HDMI data to the receiving end device via the HDMI interface.

9. The audio and video receiving device of claim 6, wherein the receiving-end peripheral interface comprises at least one USB-A interface.

10. A wireless audio and video transfer system, comprising:
a source-end connecting unit configured to receive an audio and video signal from a video source;
a transmitting-end processing unit configured to process the audio and video signal and generate a first processed audio and video signal;
a first wireless unit configured to modulate the first processed audio and video signal and generate a modulated audio and video signal;
a transmitting-end antenna configured to send the modulated audio and video signal;
a receiving-end antenna configured to receive the modulated audio and video signal;
a second wireless unit configured to demodulate the wireless signal and generate a demodulated audio and video signal;
a receiving-end processing unit configured to process the demodulated audio and video signal and generate a second processed audio and video signal;
a receiving-end connecting unit configured to send the second processed audio and video signal to a receiving end device; and
a peripheral interface configured to receive a peripheral information from a peripheral device and send the peripheral information to the transmitting-end processing unit or the receiving-end processing unit.

11. The wireless audio and video transfer system of claim 10, wherein the peripheral interface is a transmitting-end peripheral interface configured to receive a first peripheral information from a source end peripheral device and send the first peripheral information to the transmitting-end processing unit which sends the first peripheral information to the video source through the source-end connecting unit.

12. The wireless audio and video transfer system of claim 11, wherein the system further comprises a receiving-end peripheral interface configured to receive a second peripheral information from a receiving-end peripheral device and send the second peripheral information to the receiving-end processing unit;
wherein the receiving-end processing unit is further configured to process the second peripheral information and generate a processed second peripheral information, the second wireless unit is further configured to modulate the processed second peripheral information and generate a modulated second peripheral information, and the receiving-end antenna is further configured to send the modulated second peripheral information to the transmitting-end antenna.

13. The wireless audio and video transfer system of claim 10, wherein the peripheral interface is configured to receive the peripheral information from a receiving-end peripheral device and send the peripheral information to the receiving-end processing unit;
wherein the receiving-end processing unit is further configured to process the peripheral information and generate a processed peripheral information, the second wireless unit is further configured to modulate the processed peripheral information and generate a modulated peripheral information, and the receiving-end antenna is further configured to send the modulated peripheral information to the transmitting-end antenna.

14. The wireless audio and video transfer system of claim 10, wherein the first processed audio and video signal is the same as the demodulated audio and video signal, and the second processed audio and video signal is the same as the audio and video signal sent to the source-end connecting unit from the video source.

15. The wireless audio and video transfer system of claim 10, wherein the first processed audio and video signal is an encrypted signal and the second processed audio and video signal is a decrypted signal.

* * * * *